United States Patent [19]
Clegg et al.

[11] Patent Number: 5,591,287
[45] Date of Patent: Jan. 7, 1997

[54] PROCESS FOR PRODUCING LAYERED CERAMIC PRODUCT

[75] Inventors: William J. Clegg, Chester; Kevin Kendall, Runcorn, both of England

[73] Assignee: Tioxide Specialties Limited, London, England

[21] Appl. No.: 115,674

[22] Filed: Sep. 2, 1993

Related U.S. Application Data

[63] Continuation of Ser. No. 653,270, Feb. 11, 1991, abandoned.

[30] Foreign Application Priority Data

Feb. 9, 1990 [GB] United Kingdom .................. 9002986

[51] Int. Cl.⁶ .................................................. C04B 37/00
[52] U.S. Cl. ................. 156/89; 264/57; 156/196
[58] Field of Search ................... 156/89, 196; 264/29.1, 264/58, 57

[56] References Cited

U.S. PATENT DOCUMENTS

| | | | |
|---|---|---|---|
| 3,518,756 | 7/1970 | Bennett et al. | 264/58 |
| 4,756,959 | 7/1988 | Ito et al. | 264/58 |
| 4,772,524 | 9/1988 | Coblenz | 428/699 |
| 4,806,295 | 2/1989 | Trickett et al. | 264/58 |
| 5,091,025 | 2/1992 | Murakami et al. | 156/89 |
| 5,223,064 | 1/1993 | Gadkaree | 156/89 |
| 5,260,130 | 10/1993 | Enloe et al. | 156/89 |
| 5,302,328 | 4/1994 | Ezis | 264/58 |

FOREIGN PATENT DOCUMENTS

| | | |
|---|---|---|
| 0244993 | 11/1987 | European Pat. Off. . |
| 0255954 | 2/1988 | European Pat. Off. . |
| 0329484 | 8/1989 | European Pat. Off. . |

*Primary Examiner*—Christopher A. Fiorilla
*Attorney, Agent, or Firm*—Cushman Darby & Cushman

[57] ABSTRACT

Process for producing a layered ceramic product which includes sintering layers of sinterable particulate ceramic material while in face-to-face contact. Before such contact, the surface of at least one of the layers is modified to provide a zone of weakness between the layers. This zone acts to deflect a crack propagating across the layers thereby increasing the work required to break the product. The product may also have improved fracture toughness.

14 Claims, 4 Drawing Sheets

PROCESS FOR PRODUCING LAYERED CERAMIC PRODUCT

This is a continuation of application Ser. No. 07/653,270, filed on Feb. 11, 1991, which was abandoned upon the filing hereof.

FIELD OF THE INVENTION

This invention relates to a process for the production of a ceramic product, that is to a product produced by sintering a composition comprising particulate ceramic material, and more particularly to a layered ceramic product.

DESCRIPTION OF THE PRIOR ART

Products made by sintering compositions comprising particulate ceramic materials are of course well known, and it is also well known that such products have many uses and are widely used. However, they do have certain deficiencies. In particular, such products have a low level of toughness, that is they have a low resistance to impact damage and a low resistance to crack propagation and can easily be broken. The toughness of such products can be estimated by the Single Edge Notch Bend Test, that is by the SENB test.

Ceramic products generally have a low work of fracture, that is, the work required to break the product is low, and a low fracture toughness, that is, the material has a low resistance to propagation of a crack, as determined by the SENB Test.

A solution to the problem of low toughness in ceramic products may be provided, at least in part, by providing a layer of fibres in such a product. It is believed that such a fibrous layer provides increased toughness to the product by deflecting a crack in the product as it passes through the product and reaches the fibrous layer, thus inhibiting passage of the crack through the product and inhibiting formation of a complete break in the product. However, the use of fibrous materials in a ceramic product leads to certain other problems. For example, a ceramic product may be produced by sandwiching a sintered fibrous ceramic material between two layers of a composition containing particulate ceramic material, e.g. a liquid composition comprising such material, and the thus formed laminate may be pressed, and heated to remove the liquid and to sinter the particles of ceramic material. However, in this heating process during which liquid is removed from the composition and particles of ceramic material in the composition are sintered the composition necessarily shrinks. However, the fibrous material itself does not shrink with the result that shrinking of the composition is prevented or is at least inhibited, with the result that, in some cases, the fibrous material and the composition delaminate.

Other methods have been proposed for producing fibre-containing ceramic products. For example, a three dimensional structure formed of fibres of a ceramic material, e.g. a structure formed of a mat or of a stack of a plurality of mats of fibres of a ceramic material, may be impregnated with a composition of particulate ceramic material, liquid diluent, and organic binder, and the thus impregnated structure may be further processed by heating as hereinbefore described. However this impregnation process tends to result in production of a product which has the disadvantageous features hereinbefore referred to as a result of the tendency of the fibres not to contract and to resist contraction of the composition, and furthermore in effecting the impregnation the fibres in the structure tend to filter the particles of ceramic material and it is thus difficult to effect a homogeneous impregnation of the structure with the result that ceramic product which is produced also has an inhomogeneous composition and variable mechanical properties.

Fibre-containing ceramic products can be produced by a melt infiltration technique in which a structure of a ceramic fibrous material is impregnated with a melt of a ceramic material. However, very high temperatures must necessarily be used and also some ceramic materials sublime rather than melt. Furthermore as a result of the generally high viscosity of melts of ceramic materials the rate of infiltration of the melt into the fibrous structure may be very low and it may be difficult to infiltrate the whole structure homogeneously, and also the fibres of ceramic material may be damaged at the high processing temperature involved in the use of melts of ceramic materials.

A further process by which fibre-containing ceramic products may be produced is the so-called chemical vapour infiltration process in which a structure formed of fibres of a ceramic material is infiltrated with vapour of a material which can be decomposed to form the matrix of ceramic material in the product. The process may be operated at relatively low temperature, although generally at a temperature of the order of several hundred degrees centigrade. However, the damage to the fibres of the ceramic material which may be associated with the melt infiltration process may be at least to some extent mitigated in the chemical vapour infiltration process. An example of a material which in vapour form may be infiltrated into a structure formed of fibres of a ceramic material is methyltrichlorosilane which may be decomposed to form silicon carbide by heating to a temperature which may be less than 1200° C. For example, a silicon carbide fibrous structure may be infiltrated with the vapour of methyltrichlorosilane and the latter may be thermally decomposed in the fibrous structure to form silicon carbide, the product which is produced in the process comprising a matrix of silicon carbide reinforced by fibres of silicon carbide. Although the chemical vapour infiltration process does itself overcome some of the disadvantages of processes previously described, for example, the damage to the fibres of ceramic material associated with the melt infiltration process, it is itself a very time-consuming process. Indeed, the processing time involved in the production of a fibre-reinforced product may be as great as several weeks.

SUMMARY OF THE INVENTION

The present invention relates to a process for the production of a ceramic product having improved toughness which does not necessarily involve use of a fibrous material, which is readily carried out and which may result in production of a product having high resistance to crack propagation and impact damage. The invention also relates to the ceramic product itself.

According to the present invention there is provided a process for the production of a layered ceramic product having one or more zones of weakness, which process comprises positioning a layer of a first composition which comprises a sinterable particulate ceramic material in face to face contact with a layer of a second composition which comprises a sinterable particulate ceramic material and pressing and heating the compositions in the thus formed structure in order to sinter the particulate ceramic materials characterised in that at least one of the surfaces which are in face to face contact is treated prior to effecting face to face contact of the layers such that a zone of weakness is provided between the layers of the first and second compositions in the ceramic product.

DESCRIPTION OF THE PREFERRED EMBODIMENTS

In the ceramic product formed in the process of the invention a zone is formed between the layers formed from the first and second compositions which acts as a zone of weakness, typically a plane of weakness, even though the particulate ceramic materials in the compositions may become sintered to each other across the boundary between the layers formed from the compositions, and this zone may act to deflect a crack on its passage through the ceramic product from one face of the product to an opposite face, that is a crack propagating across a layer of sintered particulate ceramic material in the ceramic product in a direction normal to the plane or zone of weakness may be deflected to propagate in a direction parallel to the plane or zone of weakness, typically within the plane or zone of weakness, and referred to hereafter as the delamination crack, thus leading to increased toughness in the ceramic product.

The treatment of at least one of the surfaces of the layers of the first and second compositions which results in a zone or zones of weakness between the layers in the ceramic product may take a variety of forms. For example, it may comprise positioning a material between the layers which by its presence, itself provides the zone of weakness between the first and second layers of sintered particulate ceramic material and in a preferred embodiment of the invention, which leads to production of a ceramic product of substantially increased toughness, as determined by the SENB test, a non-sinterable particulate ceramic material, or a precursor thereof, is positioned between the layers of the first and second compositions prior to effecting face to face contact of the layers.

By a non-sinterable particulate ceramic material there is meant a particulate ceramic material, the particles of which, at the temperature at which the first and second compositions are heated in order to effect sintering of the particulate materials in the compositions, do not sinter to each other nor to the particles of ceramic material in the first and second compositions.

Non-sinterable materials which may be used in the process of the invention include carbon, particularly carbon in the form of graphite. A suitable precursor for carbon may be an organic polymeric material in particulate form which is capable of being pyrolysed to carbon when the structure is heated in the process of the invention.

The material which is positioned between the first and second compositions need not be strictly non-sinterable and in a further embodiment of the invention a weakly sinterable particulate ceramic material or precursor thereof is positioned between the layers of the first and second compositions.

By a weakly sinterable particulate ceramic material there is meant a particulate ceramic material, the particles of which, at the temperature at which the first and second compositions are heated in order to effect sintering of the particulate materials in the compositions, may become sintered to each other and/or to particulate ceramic material in the first and second compositions to form a bond between the particles which is weaker, and preferably substantially weaker, than the bond formed between the particles of ceramic material in the first and second compositions.

Particulate ceramic materials which may be suitable for use as the weakly sinterable ceramic material in this embodiment of the invention will depend upon the particular sinterable particulate ceramic materials of the layers of the first and second compositions and in particular the temperature to which the ceramic material of the first and second layers must be heated in order to effect sintering of the particles of ceramic material in the first and second compositions. Where the sinterable particulate ceramic material of the first and second compositions is silicon carbide, the weakly sinterable particulate material may, for example be boron nitride, and where the sinterable particulate ceramic material is zirconia, the weakly sinterable particulate material may be, for example, a vermiculite.

By a weakly sinterable material there is not meant a sinterable material, the particles of which during the heating step of the process sinter to themselves or to the particles of ceramic material material in the first and second compositions to form bonds as strong as those between the particles in the layers of the first and second compositions, and the treatment step of the invention does not comprise positioning a sinterable material between the layers of the first and second compositions.

The non-sinterable or weakly sinterable particulate ceramic material which may be placed between the first and second compositions may be a ceramic material in the sense that it may be a material which does not melt at the temperature which is required to effect sintering of the particulate materials in the first and second compositions.

Where the treatment comprises positioning a non-sinterable or weakly sinterable material between the layers of the first and second compositions, it is the presence of this non-sintered or weakly sintered layer of ceramic material itself that provides the aforementioned zone of weakness between the layers in the product formed from the first and second compositions.

Where a layer of non-sinterable or weakly sinterable ceramic material is positioned between the first and second layers, the former layer should not be present in an amount which prevents the particulate ceramic materials in the first and second compositions from contracting during the heating step of the process otherwise cracking may occur within the layers of the first and second compositions. For this reason it is preferred that the thickness of the layer of non-sinterable or weakly sinterable material has a thickness less than 50 microns, more preferably less than 10 microns.

The material which may be positioned between the layers of the first and second compositions in the treatment step of the process may not itself provide the zone of weakness between the layers. It may be a material, e.g. a particulate material, which during the heating step of the process is removed from between the layers of the first and second compositions and thus the material itself may not be present in the ceramic product. For example, the material may be burnt out during the heating stage of the process so that a porous region remains as a zone of weakness. In a further embodiment of the invention, therefore, the treatment comprises positioning a material, e.g. a particulate material between the first and second compositions which during heating is removed from the ceramic product.

The particulate material which is removed from between the layers during heating may be an organic polymer, the particles of organic polymer being burned out during the heating step of the process. Suitable organic polymers include polyolefins, for example polybutadiene; vinyl halide polymers, for example polyvinyl chloride; acrylic polymers, for example polymethyl methacrylate and polyacrylonitrile, polystyrene and polymer latices. Indeed, the organic polymer is suitably in the form of a suspension in a liquid, for example water, as this aids application.

Alternatively, instead of positioning a material between the layers, the treatment may comprise physically treating the surfaces of the layers of the first and/or second compositions prior to effecting face to face contact of the layers. This treatment may weaken the bond which is formed between the layers when compared to the bond which is formed between the particles within each layer when the structure is heated. This treatment of the surface of the layers may comprise drying at least one of the surfaces of the layers of the first and second compositions prior to effecting face to face contact of the layers.

The zone of weakness may be provided between the layers of the first and second compositions by either positioning a material between the layers or by physically treating the surfaces of the layers. Alternatively, the treatments may be combined so that for example, in effecting embodiments of the invention in which a material is positioned between the surfaces of the layers of the first and second compositions and where the first and second compositions comprise a liquid diluent it is preferred to remove some of the liquid diluent from the compositions by partially drying the surfaces of the compositions prior to effecting face to face contact as this appears to result in the production of a ceramic product of substantially improved toughness.

The first and second compositions may have any suitable physical form, e.g. a sheet, film, ribbon or fibre, but they will generally be in sheet or film form and these compositions, and the respective layers in the ceramic product, may have a thickness in the range of, for example, 20 microns to 1 cm, e.g. 0.5 mm to 5 mm, although these ranges are given merely by way of example and are not meant to be limiting in any way.

One or more particulate ceramic materials may be used in the first and second compositions, and the particulate ceramic material in the first and second composition may be the same or different. In general, the same particulate ceramic material will be used in the first and second compositions.

The first and second compositions used in the process of the invention may contain any suitable sinterable particulate ceramic material. The particulate ceramic material may be an oxide or a mixture of oxides of a metallic or of a non-metallic element, for example, an oxide of aluminium, calcium, magnesium, silicon, chromium, hafnium, molybdenum, thorium, uranium, titanium, or zirconium. The ceramic material may be a carbide of, for example, boron, chromium, hafnium, molybdenum, niobium, tantalum, thorium, titanium, tungsten, uranium, zirconium or vanadium. The ceramic material may be silicon carbide. The ceramic material may be a boride or a nitride, for example, a boride or a nitride of one or more of the elements hereinbefore referred to.

The ceramic material is a material which may be heated to an elevated temperature, eg. to a temperature in excess of 1000° C., or even 2000° C. or more, to cause the particles of the material to sinter together. Within the scope of the term particulate ceramic material there is also included those metals which when in a powdered form can be sintered or fused together by application of heat, that is those metals which are susceptible of processing by the technique of powder metallurgy. Suitable metals include aluminium and its alloys, copper and its alloys, and nickel and its alloys.

The particulate ceramic material may be a mixture of particles, for example, comprising a mixture of a particulate metal or metals and/or a particulate ceramic non-metallic material or materials.

The particles of ceramic material in the first and second compositions may have any convenient size, although it is preferred that they are of relatively small size.

It is preferred that the particles of ceramic material are of relatively small size, for example a size of less than 5 microns. Particles having a size of less than 1 micron and even less than 0.2 micron are more preferred as the use of such particles enables sintering of the particles of ceramic material to be effected at lower temperatures and at faster rates than would be the case with larger size particles. The particulate ceramic material may have a mono-modal particle size distribution, that is, the particles may be all of substantially the same size, or the particle size distribution may be multi-modal, that is, the particles may comprise a plurality of sizes.

The first and second compositions suitably comprise particulate ceramic material and a liquid diluent which acts as a carrier for the particulate material. The compositions also preferably comprise an organic material, eg a polymeric material, in solution in the liquid diluent, and the compositions preferably have a dough-like consistency such that the compositions are readily shapable, eg by calendering, by extrusion or by pressing, into a desirable form, eg a sheet or film form, for use in the process of the invention.

The liquid diluent may be an organic liquid or it may be an aqueous liquid, eg. water or a solution of water and an organic liquid. The nature of the liquid diluent will be determined at least in part by the nature of the organic material in the compositions. It is desirable that the organic material be soluble in the liquid diluent and the liquid diluent will be selected accordingly. The liquid diluent may be an alcohol, especially a lower alcohol, eg. methanol or ethanol, but for reason of non-toxicity and non-flammability it is preferably water.

Suitable water soluble organic polymeric materials for use in the compositions include (a) cellulose ethers, for example hydroxypropyl methyl cellulose, (b) amide-substituted polymers, for example a polymer or copolymer of acrylamide, (c) polyalkylene oxide derivatives which may be, for example a polyalkylene oxide (alternatively described as a polyalkylene glycol) for example polyalkylene glycols of molecular weight above about 10,000, and (d) a hydrolysed vinyl acetate polymer or copolymer. The polymer may be a copolymer of vinyl acetate and a monomer copolymerisable therewith, but it is preferably a hydrolysed poly(vinyl acetate).

In order to aid solubility in water the degree of hydrolysis of the vinyl acetate polymer or copolymer will generally be at least 50%, preferably in the range 70% to 90%.

As the liquid diluent and the organic material must be removed from the compositions in the heating stages of the process it is preferred, in order to avoid excessive shrinkage, that the amounts of liquid diluent and organic material in the compositions from which the ceramic product is produced are not excessive, and in particular it is preferred that the compositions contain a high proportion of particulate ceramic material. The compositions preferably comprise greater than 50% by weight of particulate ceramic material, more preferably at least 70% by weight. The compositions may contain as much as 95% by weight of particulate ceramic material.

The proportion of liquid diluent in the compositions will generally be greater than 5% by weight but will generally be not more than 25% by weight.

The proportion of organic material in the compositions, particularly where the material is an organic polymeric material, will be chosen in part to give to the composition a consistency suitable for shaping, particularly for shaping into a sheet or film.

The compositions will generally contain at least 3% by weight of organic material but generally not more than 20% by weight.

The components of the compositions may be mixed in a simple manner, for example, by mixing in a bladed mixer. However, it is preferred that the components of the compositions are homogeneously mixed and to this end mixing under conditions of high shear is preferred, as in a screw extruder. A preferred form of high shear mixing is that which may be effected on a twin-roll mill the rolls of which may be operated at the same or different peripheral speeds. The compositions may be passed repeatedly through the nip between the rolls of the mill, which nip may be progressively decreased to a size as low as 0.1 mm or lower with the result that very high shear may be applied to the compositions which assists in breaking down aggregates of particulate ceramic material which may be present in the compositions and assists in the production of a homogeneously mixed composition.

In effecting embodiments of the invention in which a non-sinterable or weakly sinterable particulate ceramic material, or a precursor thereof, or other particulate material, e.g. one which is to be removed by heating, is positioned between the first and second compositions, the material may be applied to a face of the first composition or to a face of both the first and second compositions, and the latter compositions then brought into fact to face contact.

The material may be applied, for example, by coating a suspension of the material, for example, by brush application, onto one or both of the surfaces of the layers of the first and second compositions. Alternatively where a non-sinterable or weakly sinterable material is positioned between the layers, a sheet of the non-sinterable or weakly sinterable material, for example a sheet of graphite, may be first prepared and this sheet then positioned between the layers.

In a preferred embodiment of the invention, the first and second compositions are provided by a single sheet of particulate sinterable ceramic material on which a layer, for example a sheet, of non-sinterable or weakly sinterable material is positioned. The sheet is then folded in order to contact the layer or sheet of non-sinterable or weakly sinterable material between upper and lower layers of sinterable particulate ceramic material.

If desired, a structure may be built up comprising a plurality of alternating first and second compositions with a non-sinterable or weakly sinterable particulate ceramic material or precursor thereof being positioned between adjacent first and second compositions, preferably between each adjacent first and second composition. Where the first and second layers are provided by folding a single sheet of sinterable particulate ceramic material and a layer or sheet of non-sinterable or weakly sinterable material, such a structure may be achieved, for example, by repeating the folding process whilst optionally pressing the structure between each folding operation.

The structure which is formed may suitably be subjected to pressure, e.g. in a hydraulic press, in order to assist in effecting face to face contact between the first and second compositions.

In a subsequent stage of the process of the invention the structure is heated in order to evaporate the liquid diluent, if present, and to decompose the organic material, if present, and to sinter the particles of ceramic material in the compositions.

The structure need be heated at only a relatively low temperature in order to evaporate the liquid diluent, a temperature of up to 100° C. or possibly slightly higher generally sufficing, although the temperature to be used will depend to some extent on the nature of the liquid diluent.

Similarly, the nature of the organic material will determine at least to some extent the temperature to which the structure should be heated in order to decompose the organic material and remove the material from the structure. In general a temperature of up to 500° C. may suffice, although a higher temperature may be used, eg a temperature of up to 750° C.

Similarly, the temperature at which sintering of the particles of ceramic material in the first and second compositions may be effected will also depend at least to some extent on the nature of the ceramic material and on the form of the ceramic material, eg. the particle size and the particle size distribution. The temperature at which sintering may be effected will generally be at least 1000° C. and it may even be up to a temperature of 2000° C. or greater.

Although in the aforementioned description specific temperatures have been referred to at which to remove the liquid diluent and decompose the organic material, and sinter the particles of ceramic material, these process steps may be effected by heating the structure gradually to progressively higher temperatures, with the temperature possibly being maintained at a particular temperature or temperatures for a specific period of time during the heating to progressively higher temperatures.

In order to avoid undesirable oxidation it may be desirable to effect some at least of the heating in a non-oxidising atmosphere, e.g. in an atmosphere of an inert gas. Use of such an atmosphere may be particularly desirable at the higher temperatures.

The ceramic product which may be produced by the process of the invention is one having an improved toughness in terms of the work of fracture of the ceramic product as determined by the SENB test. A ceramic product having an improved toughness in terms also of the fracture toughness may also be produced by the process of the invention and in a preferred embodiment of the product of the invention there is provided a layered ceramic product which comprises a plurality of layers of a sintered particulate ceramic material and a zone of weakness between adjacent layers, and which fails, when subjected to a single edge notch three point bend test, by propagation of a crack across a layer of sintered particulate ceramic material to an adjacent zone of weakness, the crack being deflected by and along the zone of weakness, and the crack then propagating across the adjacent layer of sintered particulate ceramic material from a position other than from the tip of the crack in the zone of weakness.

The manner in which a crack is propagated through the ceramic product may be studied, in order to determine whether the ceramic product has cracked in the aforementioned manner, by monitoring the propagation of the crack through the ceramic product by eye, and by examining by scanning electron micrography the parts of the ceramic product resulting after fracture of the ceramic product in a SENB test.

As described previously, the toughness of the ceramic product is improved in terms of the work of fracture, as determined by the SENB test, due to a crack which propagates across a layer of the sintered ceramic material being deflected so that it propagates in a direction parallel to and along the zone of weakness. This propagation of the crack along the zone of weakness may be termed the "delamination crack". The crack may then propagate across the next layer of sintered particulate ceramic material in one of two ways. Where a ceramic product of improved toughness in terms of work of fracture but not fracture toughness is produced, the crack propagates from the tip of the delamination crack.

Where a ceramic product of improved toughness in terms of fracture toughness as well as work of fracture is produced, the crack propagates from the delamination crack from a position on the delamination crack other than from the tip thereof. The improvement in fracture toughness of a ceramic product which fails in this way may be as great as 4 times the fracture toughness of a layered ceramic product which fails by propagation of a crack from the tip of the delamination crack in the zone of weakness.

It is believed that the thickness of the zone of weakness is one of the factors which determine whether the ceramic product has an improved fracture toughness as well as work of fracture. It is therefore preferred that the thickness of the layer which provides the zone of weakness is not less than 1 micron, and more preferably not less than 3 microns.

It is further believed that the uniformity of the thickness of the zone of weakness is also an important factor, so that the layer providing the zone of weakness preferably has a substantially even thickness.

BRIEF DESCRIPTION OF THE DRAWINGS

This preferred product of the invention having improved fracture toughness is illustrated by the following figures in which.

Figure 1:
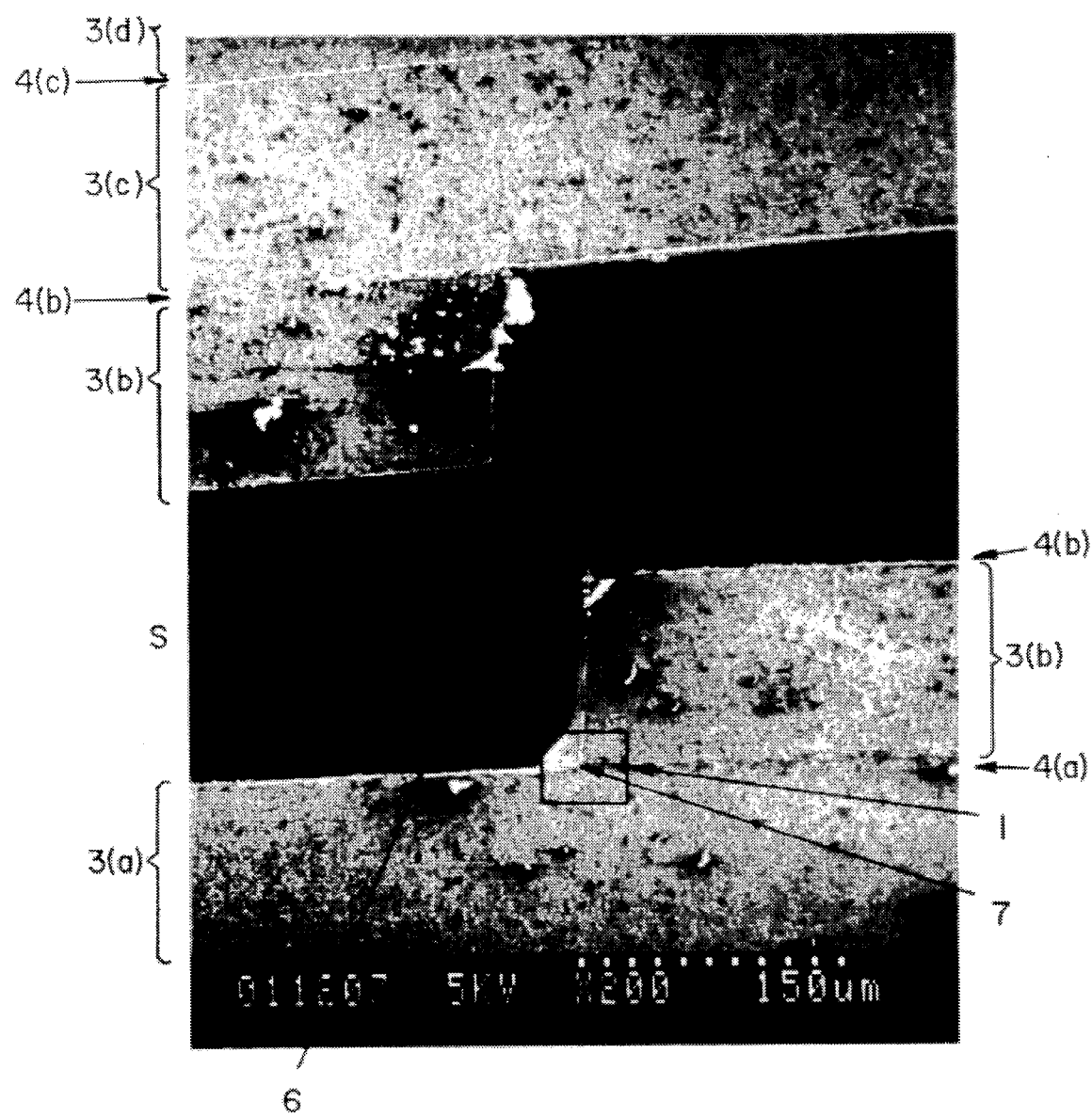
FIG. 1 is a scanning electron micrograph of a layered ceramic product which, when subjected to a SENB test failed by propagation of a crack from the tip of a delamination crack.

The layered ceramic product of FIG. 1 is a test bar cut from the product of example 1 comprises layers 3 of sintered silicon carbide having an average thickness of 125 microns, and zones of weakness 4 comprising graphite layers having an average thickness of 1.8 microns.

Figure 2:
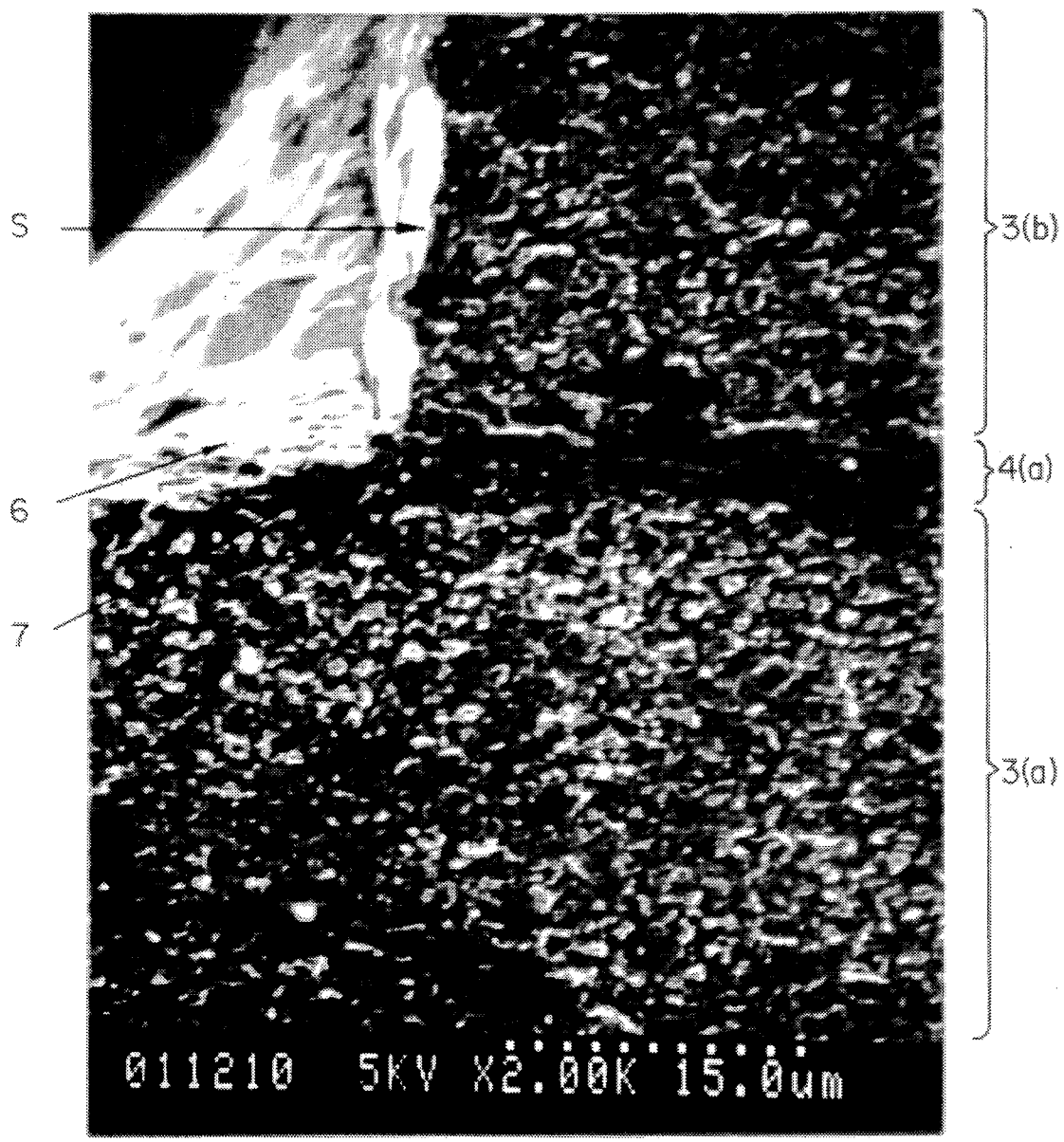
FIG. 2 is a scanning electron micrograph magnification of the area 1 in FIG. 1.

When subjected to a SENB test, a crack propagated across the silicon carbide layer 3(a) at a position not shown and was deflected as a delamination crack along the zone of weakness 4(a). The next layer of silicon carbide 3(b) then cracked by propagation of a crack 5 from the tip (7) of the delamination crack 6. The zone of weakness 4(a) has not cracked beyond the tip of the delamination crack. This can be seen more clearly in the magnification of FIG. 2 in which layers 3(a) and (b) are shown and zone of weakness 4(a) is shown. Clearly the delamination crack has not propagated along the zone of weakness beyond the position from which it has propagated through the layer 3(b).

Figure 3:
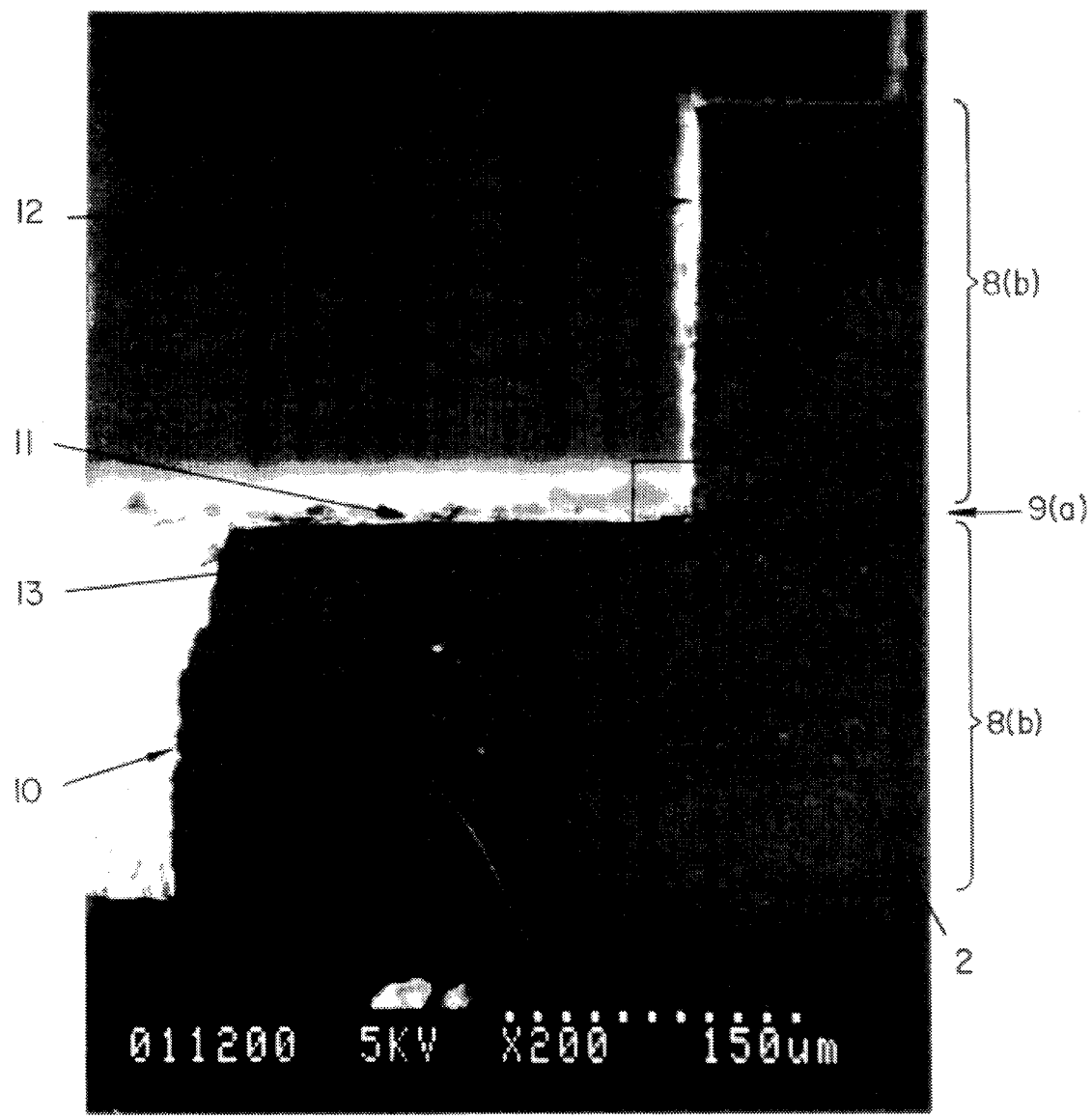
FIG. 3 is a scanning electron micrograph of a layered ceramic product which, when subjected to a SENB test failed by propagation of a crack from a position other than the tip of a delamination crack.

The layered ceramic product of FIG. 3 is a test bar cut from the product of example 2 and comprises layers 8 of sintered silicon carbide having an average thickness of 200 microns and zones of weakness 9 comprising layers of graphite having an average thickness of 5 microns.

Figure 4:
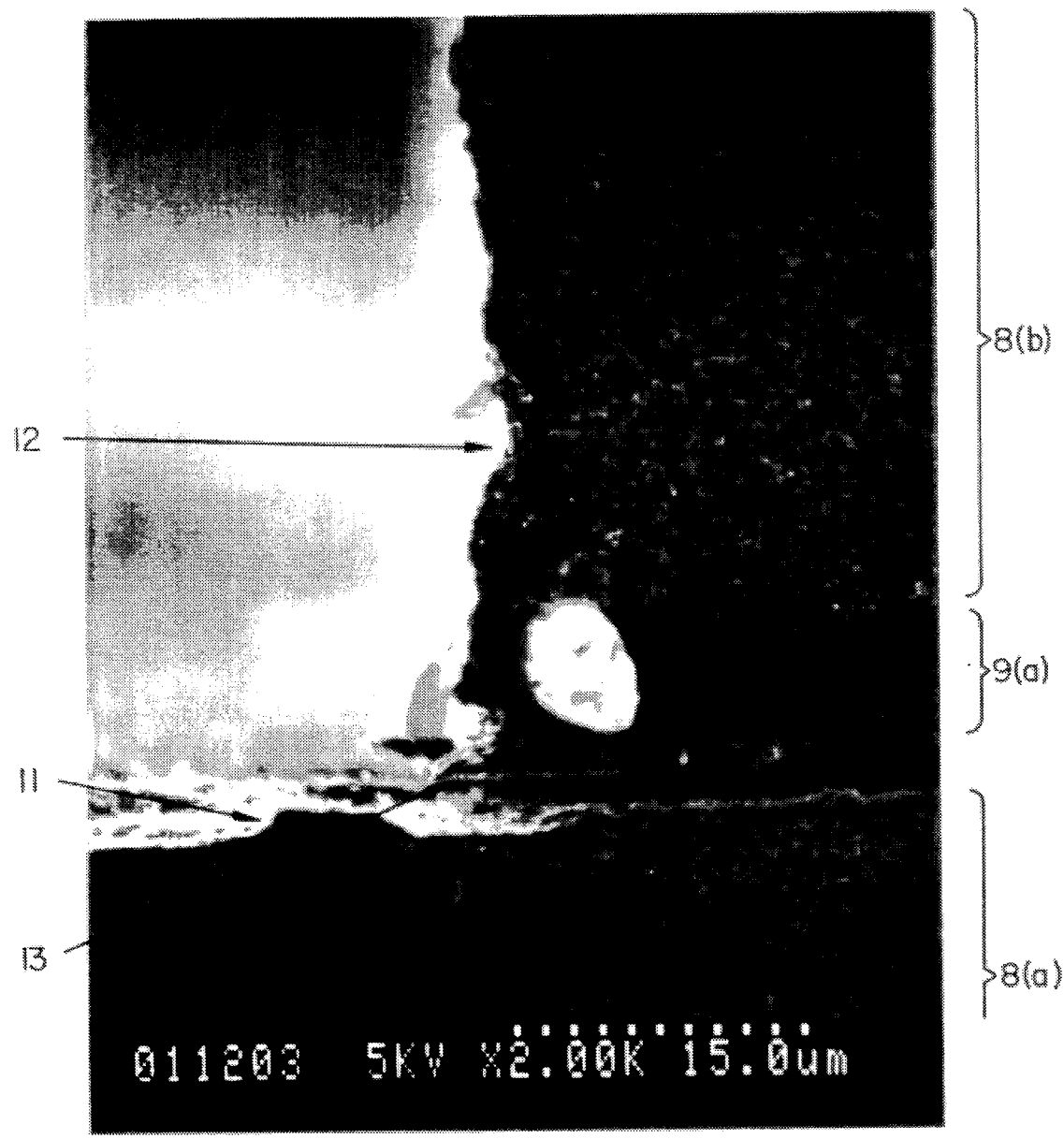
FIG. 4 is a scanning electron micrograph magnification of the area 2 in FIG. 3.

When subjected to a SENB test, a crack 10 propagated across the silicon carbide layer 8(a) and was deflected as a delamination crack 11 along the zone of weakness. The next layer 8(b) of silicon carbide then cracked by propagation of a crack 12 from from a position 13 other than the tip of the delamination crack (not shown). This can be seen more clearly in the magnification of FIG. 4 in which layers 8(a) and (b) are shown and zone of weakness 9(a) is shown. Clearly the delamination crack has propagated along the zone of weakness beyond the position 13 from which it has propagated across the layer 8(b).

EXAMPLES

The invention is illustrated by the following examples in which all parts are expressed as parts by weight. The SENB test in which work of fracture and fracture toughness measurements were made was carried out as described on p. 131 of "Fundamentals of Fracture Mechanics" by J. F. Knott and using the appropriate compliance coefficients given on p. 132. However, the span to depth ratios recommended in Knott were not used since the low values recommended are likely to lead to failure of the sample by shear across its mid-plane rather than crack growth from the notch. To avoid this possibility, and to ensure that failure was by crack growth from the notch, the span:depth ratio should be at least 10:1, and in the SENB tests carried out in the following examples was 15:1. Further parameters were as follows:
NOTCH DEPTH: from 0.3 to 0.5 W
BREADTH of SAMPLE: from 0.5 to 2 W, where W=depth of the sample.
WIDTH OF NOTCH: not greater than 200 microns.

Example 1

A composition of 50 parts of silicon carbide powder having a particle size of 0.2 micron, and containing 0.2 part of boron, 3 parts of hydrolysed polyvinyl acetate having a degree of hydrolysis of 80%, 7.5 parts of water, and 2 parts of glycerol were mixed on a twin-roll mill and formed into a band on the mill.

The band was repeatedly removed from the mill and re-inserted through the nip between the rolls of the mill in order to mix the components of the composition thoroughly. The composition was then calendered into the form of a sheet having a thickness of 150 microns.

The sheet was allowed to stand at room temperature for 24 hours and then 15 50mm×50mm squares were cut from the sheet and a suspension of graphite in water was spread over a face of each of the squares. The squares were then brought into face to face contact so that the graphite coated face of one square was in face to face contact with the uncoated face of an adjacent square the thus formed structure was pressed at a pressure of 4 tons, and the structure was allowed to dry. The structure was then heated in an argon atmosphere at a rate of increase of temperature of 1° C. per minute up to a temperature of 800° C., then at a rate of increase of temperature of 15° C. per minute up to a temperature of 2040° C., and finally the structure was heated at 2040° C. for 15 minutes. The density of the ceramic product, determined by weighing and measuring was 98.2% of the theoretical maximum density. Scanning electron microscopy of polished sections of the ceramic product showed that the layers had retained their integrity and that the graphite layers had an average thickness of 1.8 microns.

Bars of dimensions length 2 cm and width 2 mm were cut from the ceramic product and the work of fracture was determined in the Single Edge Notch Bend (SENB) test. The average work of fracture of the bars was 752 $Jm^{-2}$ compared with 40$Jm^{-2}$ for a ceramic product produced as described above but without coating one face of the squares with the suspension of graphite in water, and 52$Jm^{-2}$ for monolithic silicon carbide.

Example 2.

Squares were produced as in example 1 except that the squares were calendered to a thickness of 240 microns. The squares were then coated with a suspension of graphite in water on both faces and 15 squares were brought into face to face contact, and the resulting structure was pressed, dried and heated as described in example 1. The final density was 99.1% as determined by weighing and measuring. Scanning electron microscopy showed that the layers had retained their integrity and had an average thickness of 5 microns.

Bars were cut from the ceramic product and SENB tests carried out as in example 2. The average work of fracture of the bars was >6000 $Jm^{-2}$ and the fracture toughness was 18 MPa $m^{-1/2}$ compared to 3.6 MPa $m^{-1/2}$ for monolithic silicon carbide.

Example 3.

This example was carried out in order to show that the graphite layers in the ceramic products produced in Examples 1 and 2 are weak.

Sheets of silicon carbide, prepared as described in example 1, were pressed onto one end of each of four silicon carbide blocks having a thickness of 10mm and which were prepared by plastic mixing on a twin roll mill a composition as described in example 1. The blocks were divided into two pairs, (a) and (b), and a suspension of graphite in water was coated onto the silicon carbide sheet of (a) one of the blocks and (b) both blocks.

In (a) the graphite coated surface of one block was brought into face to face contact with the silicon carbide sheet of the other block, and in (b) the graphite coated surfaces of the blocks were brought into face to face contact.

The blocks were then pressed together under a pressure of 20 tons and the blocks heated as described in example 1.

The graphite layer between the blocks in the final structure (a) had a thickness of 2 microns and in (b) 5 microns.

Sample bars were then cut from the structures and the samples were arranged for testing in a SENB test with the graphite layer parallel to the application of force so that failure was by propagation of a crack across the graphite layer. In both cases, the fracture toughness of the graphite layer was 1.7 MPa $m^{-1/2}$ and the work of fracture was 6.2 $Jm^{-2}$.

Example 4.

The procedure of mixing on a twin roll mill described in example 1 was repeated with a first composition of 50 parts of silicon carbide powder having a mean particle size of 0.1 micron, 5 parts of hydrolysed polyvinyl acetate having a degree of hydrolysis of 80%, and 7.5 parts of water, and the thus mixed composition was then calendered into the form of a first sheet having a thickness of 1mm.

A second composition of 50 parts of carbon black, having a surface area of 20$m^2$ $gm^{-1}$, 5 parts of polyvinyl alcohol and 9 parts of water was mixed in a twin roll mill following the procedure described in example 1 and the composition was then calendered into the form of a second sheet having a thickness of 0.15mm.

The second sheet was then placed on top of, and brought into face to face contact with, the first sheet and the structure was rolled to a thickness of 0.5mm. The structure was folded such that the second sheet was contacted between upper and lower layers of the first sheet and the structure rolled to a thickness of 0.5mm. The folding and rolling process was repeated 5 times. The final structure was dried and heated as in example 1.

Test bars were cut from the final sintered ceramic product and the work of fracture and fracture toughness were determined in the SENB test. The average work of fracture of the bars was 626 $Jm^{-2}$ and the average fracture toughness was 4.4 MPa $m^{-1/2}$.

Example 5.

A suspension of colloidal graphite was prepared by mixing 25 parts of colloidal graphite with 2 parts of hydrolysed polyvinyl alcohol having a degree of hydrolysis of 80% and 15 parts of water. A sheet of colloidal graphite was prepared from the suspension by dipping a bolt into the suspension and drawing it over a glass plate leaving a film of colloidal graphite on the glass plate. The film was allowed to dry in air for 24 hours and when dry had a thickness of 20 microns. The film was interleaved between the adjacent faces of a stack of 15 squares of silicon carbide prepared as in example 2, and each having a thickness of 200 microns.

The stack was pressed and heated as in example 1 and the resulting density of the ceramic product, determined by weighing and measuring, was 96.8% of the theoretical maximum density.

Test bars were cut from the final sintered ceramic product and the work of fracture and fracture toughness of the bars were determined in an SENB test. The average work of fracture of the bars was 2740 $Jm^{-2}$ and the average fracture toughness was 9.5 MPa $m^{-1/2}$.

Example 6.

15 silicon carbide squares were prepared as in example 1.

A slurry of submicron boron nitride powder in water was then coated on both faces of the squares, and the squares were brought into face to face contact. The thus formed structure was pressed together at a pressure of 4 tons. The structure was then allowed to dry and heated as in example 1. The resulting density of the ceramic product, determined by weighing and measuring, was 95.3% of the theoretical maximum density.

Test bars were cut from the final sintered ceramic product and the work of fracture of the bars was determined in an SENB test. The average work of fracture of the bars was 356 $Jm^{-2}$.

Example 7.

15 silicon carbide squares were prepared as in example 1.

A 10% suspension by volume of spherical polystyrene particles in water was then coated on both faces of the squares and the squares were allowed to dry in air for 24 hours. The squares were brought into face to face contact, and the thus formed structure was pressed and heated as in example 1 except that the structure was pressed at 80° C.

Test bars were cut from the final sintered ceramic product and the work of fracture of the bars was determined in an SENB test. The average work of fracture of the bars was 400 Jm$^{-2}$.

Example 8.

A dough was prepared by plastic mixing of the composition described in example 1. The dough was then extruded through a fine orifice to give fibres having a diameter of 150 microns. The fibres were coated with a suspension of graphite in water and were brought into face to face contact and pressed together in a small metal die at a pressure of 8 tons to give a single test bar having dimensions 25mm×5mm×2mm. The bar was heated as in example 1 and the final density, determined by weighing and measuring was 98.4% of the theoretical maximum density.

The work of fracture and fracture toughness of the bar were determined in a SENB test. The work of fracture was 2,100 Jm$^{-2}$ and the fracture toughness was 7.6 MPa m$^{-\frac{1}{2}}$.

Example 9.

The procedure of milling on a twin roll mill described in Example 1 was repeated with a composition comprising 37.5 parts of zirconia stabilised with 3 mole % of yttria, 2.5 parts of 80% hydrolysed polyvinylacetate and 3.2 parts of water, and the thus mixed composition was extruded into 0.3 mm diameter rods. The rods were dried at 90° C. for 12 hours to dry the surfaces of the rods and then stacked one on top of another in a mould and pressed at a pressure of 533MPa. The mould was then heated at a rate of increase of temperature of 1° C. per minute up to 500° C., then at a rate of increase of temperature of 5° C. per minute up to 1450° C., and finally at 1450° C. for 1 hour.

The resultant ceramic product had a work of fracture 10 times greater than that of a ceramic product produced by charging a composition as described above directly to a mould as used in the above described example, and heating and pressing the composition in the mould following the above described procedure.

Example 10.

The procedure of milling on a twin roll mill described in Example 1 was repeated with a composition comprising 75 parts of zirconia having a particle size of 0.3 microns and stabilised with 3 mole % of yttria, 6 parts of 80% hydrolysed polyvinylacetate, 7.5 parts of water, and 1 part of glycerol and the thus mixed composition was calendered into the form of a sheet having a thickness of 240 microns.

The sheet was allowed to stand at room temperature for 24 hours an then 15 50mm by 50mm squares were cut from the sheet and a suspension of a vermiculite in water was spread over both faces of the squares. The squares were then brought into face to face contact as a stack and the stack was pressed together at a pressure of 20 tons at a temperature of 75° C. The structure was then heated in an argon atmosphere at a rate of increase of temperature of ½° C. per minute up to a temperature of 800° C., then at a rate of increase of temperature of 3° C. per minute up to a temperature of 1450° C., and finally the structure was heated at 1450° C. for 1 hour. The density of the ceramic product, determined by weighing and measuring was 98.5% of the theoretical maximum density.

Bars of dimensions length 3cm and width 2mm were cut from the ceramic product and the work of fracture was determined in the SENB test. The average work of fracture of the bars was 676 Jm$^{-2}$ compared to 144 Jm$^{-2}$ for monolithic zirconia.

We claim:

1. A process for the production of a layered ceramic product having one or more zones of weakness, which process comprises
   (a) providing at least one layer of a first composition which comprises a sinterable particulate, non-fibrous, ceramic material,
   (b) providing at least one layer of a second composition which comprises a sinterable particulate, non-fibrous, ceramic material,
   (c) modifying a surface of at least one of said layers of a first composition and a second composition by treating said surface with a treatment material,
   (d) assembling a laminated structure containing at least one layer of a first composition and at least one layer of a second composition in which laminated structure said treatment material is positioned between said layers of a first composition and a second composition, and
   (e) heating and pressing said laminated structure in order to sinter the particulate ceramic materials and to form a bond between said layers of a first composition and a second composition, said treatment material being a non-sinterable or weakly sinterable particulate ceramic material or precursor thereof present as a layer having a thickness after pressing of between 1 and 10 microns, the treatment of said surface with said treatment material providing at least one zone of weakness between the layers of the first and second compositions in the sintered layered ceramic product thus formed whereby in use of the layered ceramic product the one or more zones of weakness serve to deflect a crack in the ceramic product propagating across the layers of sintered particulate material.

2. A process as claimed in claim 1 in which the treatment material is a non-sinterable particulate ceramic material or precursor thereof.

3. A process as claimed in claim 2 in which the non-sinterable particulate ceramic material is graphite.

4. A process as claimed in claim 1 in which the treatment material is a weakly-sinterable particulate ceramic material or precursor thereof.

5. A process as claimed in claim 4 in which the weakly sinterable particulate ceramic material is boron nitride.

6. A process as claimed in claim 1 in which the layers of the first and second compositions are in the form of sheets.

7. A process as claimed in claim 1 in which the treatment material is a particulate material which during the heating step of the process is removed from the laminated structure.

8. A process as claimed in claim 7 in which the particulate material is an organic polymer and which is applied to said surface as a suspension in a liquid.

9. A process as claimed in claim 1 in which the ceramic material of the first and second compositions is the same.

10. A process as claimed in claim 9 in which the ceramic material of the first and second compositions is silicon carbide.

11. A process as claimed in any one of claims 2, 3, 4 or 5 in which the non-sinterable or weakly sinterable material is present as a layer having a thickness after pressing between 3 and 8 microns.

12. A process as claimed in claim 2 or 4 in which a suspension of the non-sinterable or weakly sinterable material in water is coated onto the surfaces of both the layers of the first and second compositions.

13. A process as claimed in claim 2 or 4 in which the non-sinterable or weakly sinterable material is in the form of a sheet which is positioned between the layers of the first and second compositions.

14. A process as claimed in claim 2 or 4 in which the first and second compositions are provided from a single sheet of particulate sinterable ceramic material by positioning a sheet of non-sinterable or weakly sinterable material upon the single sheet and folding the sheets such that the non-sinterable or weakly sinterable material is positioned between an upper and lower layer of particulate sinterable ceramic material.

* * * * *